May 22, 1951  J. F. EMERSON  2,554,246
MAGNETIC PICK-UP DEVICE
Filed Oct. 31, 1944
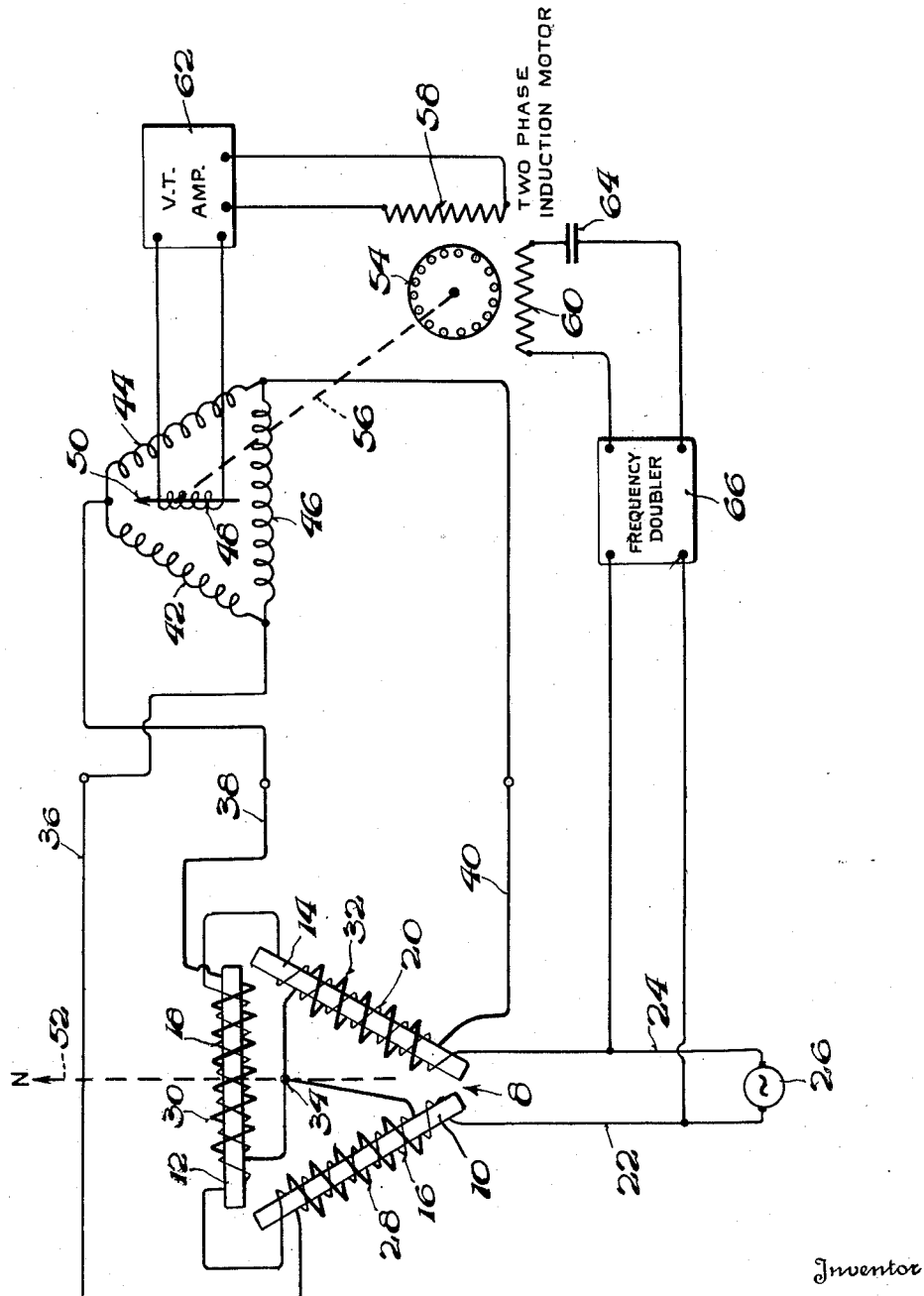
Inventor
John F. Emerson.
By C. P. Talman
Attorney Patented May 22, 1951

2,554,246

UNITED STATES PATENT OFFICE 2,554,246

MAGNETIC PICKUP DEVICE

John F. Emerson, Hasbrouck Heights, N. J., assignor to Bendix Aviation Corporation, Teterboro, N. J., a corporation of Delaware Application October 31, 1944, Serial No. 561,288

5 Claims. (Cl. 177—380)

This invention relates to an electromagnetic induction device, and more particularly to that class of devices known as magnetic pick-ups which are especially suitable for measuring the intensity of or for indicating the direction of the earth's magnetic field and which may be employed to secure a controlling function for the automatic piloting of vehicles such as marine or aircraft.

Various types of magnetic pick-ups for the above purposes have heretofore been proposed, and in applicant's copending application Serial Number 445,102, filed May 29, 1942, now abandoned, there is disclosed one type employing the principle of the open core transformer. The use of such principle presents several advantages and avoids many of the errors residing in prior devices of the closed core type.

The device of the prior application included a plurality of pairs of laminated core members arranged in predetermined relation, the members of each pair being provided with individual energizing windings arranged in opposed series relation. Each output winding is associated with the respective pairs of energizing windings and when the core members are subjected to the action of a uni-directional field simultaneously with the energization of the energizing windings from a source of periodically varying current, sufficient to effect substantial saturation of the core members, an alternating voltage consisting of even harmonics, will be induced in each output winding. With the prior arrangement, the fundamental and odd harmonics will balance out, due to the arrangement of primary windings and core members, and the amplitude and polarity of the even harmonics, will be determined by the magnitude and relative direction of the constant uni-directional field to be measured. Thus, the induced voltage was a measure of the intensity of the earth's magnetic field and could be utilized to determine the direction of such field.

The present invention constitutes an improvement over that of the prior application and the main object thereof is to provide a simplified arrangement which will dispense with the necessity of utilizing a double core member as well as the use of two primary windings on each core.

Another object is to provide a novel magnetic pick-up device of the foregoing character which may be advantageously employed to provide a plurality of output voltages which are a direct function of the strength and direction of the magnetic field to be measured.

Still another object is to provide a novel structure of the above type which utilizes single cores, consisting of one or more laminations, of the open-core type, together with single energizing windings on each core, thus materially reducing the number of parts of the prior construction while securing all of the advantageous results performed by the latter.

A further object comprehends the provision of a simplified, economical construction of the foregoing type which may be more readily manufactured and assembled, thus greatly contributing to highly efficient handling in production.

The above and other novel features and advantages of the invention will appear more fully hereinafter from a consideration of the following detailed description, when taken in connection with the accompanying drawing wherein one embodiment of the invention is illustrated. It is to be expressly understood, however, that the drawing is utilized for purposes of illustration only and is not to be construed as a definition of the limits of the invention, reference being had for this latter purpose to the appended claims.

An electromagnetic induction device 8 embodying the principles of the present invention is illustrated in the drawing as including a plurality of core members 10, 12 and 14 arranged in triangular relation, each of these members being constituted by a single, integral element comprising one or more laminations of magnetically permeable material having substantially identical magnetic characteristics and adapted to be subjected to the unidirectional magnetic field to be measured. The cores 10, 12 and 14 are provided with energizing or primary windings 16, 18 and 20, respectively, and as shown, only one winding is wound around each respective core, the group of windings, being connected in series and having a pair of terminals 22 and 24 connected to a suitable source of periodically varying current such as alternator 26. Surrounding the primary windings 16, 18 and 20 are the respective secondary or output windings 28, 30 and 32, the latter being connected in Y-relation, for a purpose which will appear more fully hereinafter, by connecting like ends of the windings together at 34, the opposite ends of the respective windings constituting terminals 36, 38 and 40.

With the foregoing arrangement and disregarding for the moment, the effect of the earth's magnetic field and the Y-relation of the output windings 28, 30 and 32, each of the latter windings will have induced therein, an alternating voltage comprising the fundamental and odd harmonics of the source 26, it being understood that the latter is of such nature as to periodically saturate the cores 10, 12 and 14. Now when a uni-directional magnetic field, due to the earth's magnetic field, for example, acts on the cores 10, 12 and 14, even harmonic components are induced in the secondary or output windings 28, 30 and 32. This is due to the fact that during each half cycle of the exciting current, the flux produced thereby alternately aids and opposes the flux of the earth's magnetic field. The second harmonic is predominant in the even harmonic components and in the interests of simplicity will be considered to be the even harmonic induced in the three output windings. It will be especially noted, and this is one of the important aspects of the present invention, that by connecting the output winding 28, 30 and 32 in Y-relation, the fundamental and the odd harmonics which would otherwise be present in such windings are balanced out as between any two of the output terminals 36, 38 or 40. This balancing out, will not occur as to the even harmonic, however, and hence such harmonic will be present as between any two of the three output terminals, it being understood that the magnitude of the second harmonic voltage component generated in each arm of the magnetic pick-up device is proportional to the cosine of the angle between such arm and the direction of the earth's magnetic field. Since each of the cores is saturated twice per cycle of the energizing current, the signals induced in the output windings will have a frequency double the frequency of the energizing current.

Means are provided for remotely indicating the direction of the earth's magnetic field as determined by the voltages induced in the windings 28, 30 and 32, and as shown, such means includes an inductive device having a stator comprising three windings 42, 44 and 46 arranged in delta relation and connected with the terminals 36, 38 and 40, together with an inductively coupled rotor winding 48 having an indicator pointer 50. Although shown as delta wound, the stator windings may be Y-connected as well. With such an arrangement, it will be readily understood that the voltages induced in the output windings of the device 8 and which appear between any two of the output terminals 36, 38 and 40, will be reproduced in the windings 42, 44 and 46 and that a single phase voltage will be induced in the rotor winding 48 when the position of the device 8 is not the same as that of the winding 48. For purposes of illustration, the line 52 indicates magnetic north and when the device 8 and winding 48 occupy the position shown, the latter is said to be in a null position with respect to the stator windings 42, 44 and 46. Under these conditions the pointer will indicate magnetic north However, if the craft on which the device 8 is mounted changes its heading, then a voltage will be induced in the winding 48, due to the angular change in the maximum resultant field produced by the windings 42, 44 and 46.

In order to utilize the voltage induced in the winding 48 for the purpose of angularly displacing the latter to restore it to a null position, a two phase induction motor 54 is mechanically connected to the rotor 48 as by means of a connection 56 which includes any suitable type of reduction gearing, the said motor being provided with field windings 58 and 60 arranged in quadrature. The winding 58 is energized from the rotor winding 48, through a suitable amplifier 62, while the winding 60 is connected to the alternating current supply source 26 through a phasing condenser 64 and a frequency doubler 66. Doubler 66 is provided so as to supply the fixed motor phase with current of the same frequency as that energizing the variable phase derived from device 8. With such an arrangement the motor 54 is rendered self-starting and upon energization of winding 58, operates to restore the rotor winding 48 to a null position where the pointer 50 will be in agreement with the position of the device 8.

In operation, when the parts are in the position shown on the drawing, it being assumed that the craft is heading due north, the winding 48 occupies the null position with respect to the windings 42, 44 and 46. This is due to the fact that the voltages in the three stator windings 42, 44 and 46 are balanced in their inductive relationship with respect to winding 48 and hence, no current is supplied to the winding 48, the motor 54 being stationary under these conditions.

In the event, however, that the craft on which the device 8 is mounted, changes its heading so that the said device is displaced angularly respecting the direction of the earth's magnetic field, the even harmonic voltages induced in the output windings 28, 30 and 32 and present in the stator windings 42, 44 and 46 will exert an unbalanced inductive effect upon the rotor winding 48, thus inducing an alternating voltage therein which will produce an alternating current in the field winding 58. Motor 54 immediately begins to rotate and through the connection 56, rotates the rotor 48 and pointer 50 carried thereby back to a null position corresponding to the new position of the device 8 with respect to the earth's magnetic field. Upon reaching the new null position, the voltages in the stator windings 42, 44 and 46 reach a balanced condition in their inductive relationship with the rotor 48, and since no voltage will be induced in the latter, under these conditions, the motion of the motor is arrested. A suitable scale may be provided for indicating the position of the pointer 50, and it is also to be understood that if desired, the motion of the rotor winding 48 may be employed for controlling the directional characteristics of the craft on which the apparatus is mounted.

It will be readily perceived from the foregoing that the present invention provides a novel and simplified magnetic pick-up device which includes a plurality of open core transformers, arranged in a predetermined geometrical relationship and wherein each transformer includes but a single core and a single primary winding. The provision of the Y-connected output windings which are respectively inductively associated with the primary windings enables the fundamental and odd harmonics to be balanced out in a novel and efficient manner so that when the device is subjected to the action of the earth's magnetic field, the predominant second harmonic is produced in the output windings and may be readily employed for indicating the direction of the earth's field or for exercising a controlling function of the craft.

While but one embodiment of the invention has been disclosed and described herein with considerable particularity, various changes may be resorted to, as will be readily understood by those skilled in the art, without departing from the scope of the invention. Reference will therefore be had to the appended claims for a definition of the limits of the invention.

What is claimed is:

1. An electromagnetic induction device comprising a plurality of magnetically permeable cores arranged in a selected order and subjected to a uni-directional magnetic field, a single primary winding on each of said cores, said windings being connected in series, a single output winding on each of said cores, a source of periodically varying current connected to said primary windings for energizing all said primary windings and for periodically varying the permeability of said cores, said primary winding being arranged on the associated core so that there is induced in each output winding from the uni-directional magnetic field and the flux produced by current from said source, an alternating voltage comprising the fundamental, odd harmonics and even harmonics of the energizing current, and means connecting like ends of each of said output windings in Y-relation to balance out the fundamental and odd harmonics.

2. An electromagnetic induction device comprising a plurality of open core transformers, each of which comprises a single, elongated core of magnetically permeable material, the cores being arranged in predetermined relation and each being provided with a single primary winding wound about the periphery of said core, means connecting said windings in series, a single secondary winding inductively associated with each primary winding, and means connecting like ends of each of said secondary windings in Y-relation.

3. An electromagnetic induction device comprising a plurality of open core transformers, each including a core of magnetically permeable material and a single primary winding thereon, means connecting said windings in series, a single output coil inductively associated with each of said primary windings, means for energizing said series-connected windings and for saturating said cores comprising a source of alternating current, said primary windings being arranged so that the flux produced in said cores by said source causes the generation in each output coil of the fundamental and odd harmonics of the frequency of said source, said cores being subjected to a constant, uni-directional magnetic field whereby even harmonics are induced in each of said output coils, and means for balancing out the fundamental and odd harmonics from said output coils including connections for associating like ends of each of the last-named coils in Y-relation.

4. An electromagnetic induction device comprising a plurality of open core transformers, each of which comprises a single, elongated core of magnetically permeable material, the cores being arranged in triangular relationship and each being provided with a primary winding comprising a single coil having the convolutions thereof completely surrounding the entire cross-section of the core, means connecting said windings in series, a single secondary winding surrounding each primary winding, and means connecting like ends of each of said secondary windings in Y-relation.

5. An electromagnetic induction device comprising a plurality of open core transformers, each of which comprises a single, elongated core of magnetically permeable material, the cores being arranged in triangular relationship and adapted to be subjected to the earth's magnetic field, each of said cores being provided with a primary winding comprising a single coil having the convolutions thereof completely surrounding the entire cross-section of the core, means connecting said windings in series, a single output winding inductively associated with each core, said primary windings adapted to be supplied with energizing current from an alternating source for energizing said windings and for saturating said cores, whereby a voltage is induced in each output winding due to the earth's magnetic field and the flux produced by the energizing current, said voltage comprising the fundamental, odd and even harmonics of the frequency of the energizing current, and means connecting like ends of each of said output windings in Y-relation to balance out the fundamental and odd harmonics.

JOHN F. EMERSON.

REFERENCES CITED

The following references are of record in the file of this patent:

UNITED STATES PATENTS

| Number | Name | Date |
|---|---|---|
| Re. 22,699 | Stuart | Nov. 27, 1945 |
| 1,586,233 | Anschutz-Kaempfe | May 25, 1926 |
| 2,047,609 | Antranikian | July 14, 1936 |
| 2,053,154 | La Pierre | Sept. 1, 1936 |
| 2,149,092 | Kettler | Feb. 28, 1939 |
| 2,158,500 | Guerra | May 16, 1939 |
| 2,240,680 | Stuart | May 6, 1941 |
| 2,360,851 | Curry | Oct. 24, 1944 |
| 2,383,459 | Beach | Aug. 28, 1945 |
| 2,384,819 | Depp | Sept. 18, 1945 |
| 2,428,014 | Curry | Sept. 30, 1947 |
| 2,476,273 | Beoch | July 19, 1949 |